INVENTOR.
HERBERT A. McANINCH

United States Patent Office 3,514,216
Patented May 26, 1970

---

3,514,216
COATED COMPRESSOR BLADES
Herbert A. McAninch, Auburn, Ind., assignor to Borg-Warner Corporation, Chicago, Ill., a corporation of Delaware
Filed Mar. 6, 1968, Ser. No. 710,942
Int. Cl. F04d *19/00, 29/38;* F01d *5/28*
U.S. Cl. 230—120   2 Claims

ABSTRACT OF THE DISCLOSURE

The blades of a gas turbine compressor are coated with tetrafluoroethylene resin to reduce the deposition and build up of salt on the blades when the turbine is operating in a salt spray environment.

SUMMARY OF THE INVENTION

The present invention relates to air compressors and more particularly to providing the blades thereof with tetrafluoroethylene resin coated surfaces.

It has been found that gas turbine engines suffer serious power losses when operating in a salt water environment. Such environment results in the accumulation of salt deposits on the compressor blades of the engine, reducing the efficiency thereof. This problem places severe limitations on the operation over salt water of low flying helicopters, landing vehicles, hydrofoils, ground effects machines, and other craft which employ a gas turbine power plant.

It is an object of the present invention to provide a tetrafluoroethylene resin coating for the surfaces of the blades of a gas turbine to avoid the accumulation of salt thereon.

THE DRAWINGS

DESCRIPTION

Figure 1:
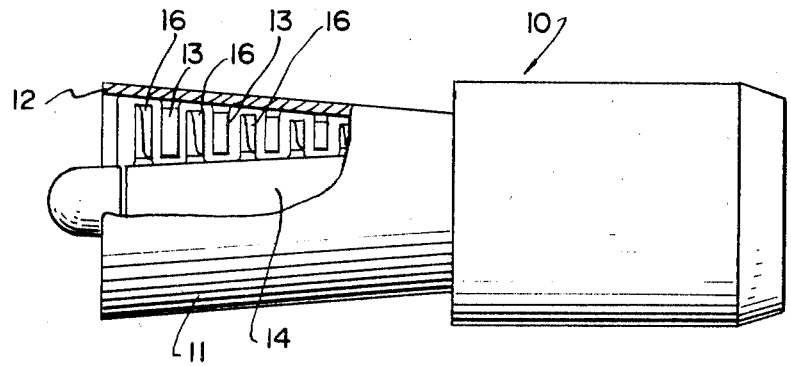
FIG. 1 is a schematic showing of a gas turbine engine with a portion of the compressor section broken away to reveal the internal flow passages therein.
Figure 2:
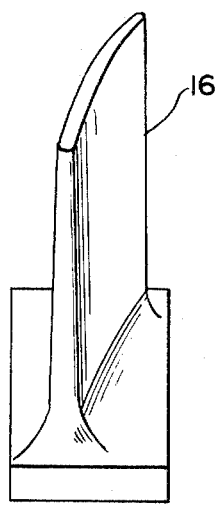
FIG. 2 is a perspective sketch of a compressor blade forming a portion of the compressor flow passage.
Figure 3:
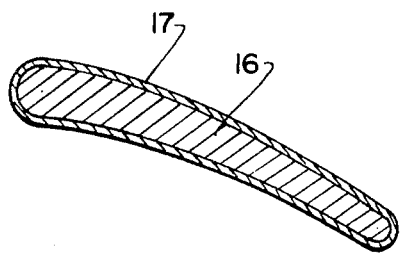
FIG. 3 is a cross section view of a portion of the compressor blade shown in FIG. 2.

A gas turbine engine is indicated generally by the reference character 10 including a compressor portion 11.

The compressor housing 12 includes rings of stationary blades 13, and a rotor 14 includes rings of cooperating blades 16. The compressor housing, the rotor, and their associated blades form the flow passage for the air passing through the compressor. The air flow passages are preferably covered with a thin coating of tetrafluoroethylene resin indicated by the reference character 17. While it is desirable to so coat the surfaces of the entire flow passage, considerable benefit can be obtained from coating only the blade portions thereof.

The accumulation of salt deposits on the compressor blades can be avoided by coating the blades with tetrafluoroethylene thereby increasing the efficiency of the engine.

I claim:

1. In a gas turbine engine adapted to operate in a salt-spray environment including a compressor therefor having a plurality of blade members, the improvement comprising a thin coating of tetrafluoroethylene resin covering a substantial portion of the surfaces of said blade members.

2. In a gas turbine engine adapted to operate in a salt-spray environment including a compressor therefor having cooperating groups of rotary and stationary compressor blades, the improvement comprising a thin coating of tetrafluoroethylene resin covering a substantial area of the surfaces of at least said rotary blades.

References Cited

UNITED STATES PATENTS

| | | |
|---|---|---|
| 2,709,569 | 5/1955 | Roush. |
| 2,840,343 | 6/1958 | Brandt et al. |
| 2,962,809 | 12/1960 | Short et al. |
| 3,125,004 | 3/1964 | White. |
| 3,173,605 | 3/1965 | Harris. |
| 3,224,666 | 12/1965 | Ljungstrom et al. |
| 3,249,083 | 5/1966 | Irgens. |
| 2,695,246 | 11/1954 | Jurgensen et al. _____ 103—114 |
| 3,207,489 | 9/1965 | Berman _____ 259—134 |
| 3,253,403 | 5/1966 | Hayes. |

OTHER REFERENCES

Publication Bulletin B-4A, New ways to use "Korda" Teflon products, Chicago Gasket Co., Chicago 22, Ill.

HENRY F. RADUAZO, Primary Examiner